United States Patent

Kuwabara et al.

[11] Patent Number: 5,575,961
[45] Date of Patent: Nov. 19, 1996

[54] ROLL-SHAPED MOLD FOR INFORMATION RECORDING MEDIUM

[75] Inventors: Tetsuo Kuwabara, Urawa; Osamu Takamatsu, Sagamihara, both of Japan

[73] Assignee: Canon Kabushiki Kaisha, Tokyo, Japan

[21] Appl. No.: 462,540

[22] Filed: Jun. 5, 1995

Related U.S. Application Data

[63] Continuation of Ser. No. 128,753, Sep. 30, 1993, abandoned, which is a continuation of Ser. No. 186,145, Apr. 26, 1988, abandoned.

[30] Foreign Application Priority Data

Apr. 30, 1987 [JP] Japan .................. 62-104674
Apr. 30, 1987 [JP] Japan .................. 62-104675

[51] Int. Cl.$^6$ .................. B29C 43/46; B29D 11/00
[52] U.S. Cl. .................. 264/1.33; 249/114.1; 264/1.6; 425/327; 425/363
[58] Field of Search .................. 249/114.1, 116, 249/140; 425/224, 237, 327, 363, 810; 264/1.33, 1.34, 1.6, 22, 106, 107

[56] References Cited

U.S. PATENT DOCUMENTS

| | | | |
|---|---|---|---|
| 1,996,057 | 4/1935 | Buckle | 425/810 |
| 3,752,731 | 8/1973 | Stiegler et al. | 425/224 |
| 3,756,760 | 9/1973 | McBride | 425/224 |
| 4,407,880 | 10/1983 | Terao et al. | 264/22 |
| 4,565,772 | 1/1986 | Takeoka et al. | 264/107 |
| 4,723,903 | 2/1988 | Okazaki et al. | 425/810 |
| 4,790,893 | 12/1988 | Watkins | 264/106 |
| 4,810,547 | 3/1989 | Mirami | 264/106 |
| 4,836,874 | 6/1989 | Foster | 264/106 |

FOREIGN PATENT DOCUMENTS 56-86721 7/1981 Japan .
61-236049 10/1986 Japan .

*Primary Examiner*—James P. Mackey
*Attorney, Agent, or Firm*—Fitzpatrick, Cella, Harper & Scinto

[57] ABSTRACT

A roll-shaped mold for forming an information recording medium has a pattern forming layer formed into a film on a roll-shaped mold substrate and having a pattern for formation of a groove for a track on a resin substrate for the information recording medium by heat molding on the circumferential wall of the pattern forming layer.

15 Claims, 2 Drawing Sheets

ROLL-SHAPED MOLD FOR INFORMATION RECORDING MEDIUM

This application is a continuation of application Ser. No. 08/128,753, filed Sep. 30, 1993, which is a continuation of application Ser. No. 07/186,145, filed Apr. 26, 1988, now both abandoned.

BACKGROUND OF THE INVENTION

1. Field of the Invention

This invention relates to a roll-shaped mold for forming an information recording medium to be used for formation of grooves for a track of an information recording medium by roll-to-roll continuous molding.

2. Related Background Art

In the prior art, an information recording medium performs recording and reproduction by light, for example, a laser beam, when grooves for a track which serve to guide the laser beam for recording and/or reproduction on a plastic substrate by heat molding, such as compression, extrusion molding or injection molding, a flat plate stamper has been used as the stamper. Its production method comprises forming a photoresist film subjected to patterning by irradiating a laser beam onto a photoresist film coated on a glass plate followed by developing, and subsequently repeating nickel electroforming for plural times with the use of the photoresist film as the original mold to obtain an electroformed mold having the pattern transferred thereon, which is pressed as the stamper on a substrate to form grooves for the track. For example, as disclosed in Japanese Laid-open Patent Application No. 236049/1986, a glass original plate having unevenness signals recorded directly thereon has been known as the stamper for disc molding.

However, the system of forming grooves for track of information recording medium by use of a mold of the flat plate stamper of the prior art is not suitable for a production system which aims at low cost.

For example, it is difficult to use a flat plate stamper for forming grooves for track according to continuous steps such as the roll-to-roll system.

As the method for solving these problems, Japanese Laid-open Patent Application No. 86721/1981 discloses a method for producing information recording discs in a large amount at low cost by the roll-to-roll system by molding acoustic grooves of a thermoplastic resin with molding rolls.

SUMMARY OF THE INVENTION

An object of the present invention is to provide a roll-shaped mold for information recording medium capable of transferring a highly precise pattern on a substrate with good precision during formation of a groove for a track. The track serves to guide an optical beam for recording and reproduction on a substrate for information recording medium in a method for a transferring a groove for track by use of such a molding roll.

Another object of the present invention is to provide a method for producing a roll-shaped mold for information recording medium which can transfer a highly precise pattern on a substrate with good precision and is also short in production time.

A further object of the present invention is to provide a method for producing an information recording medium substrate which can obtain good tracking signals.

According to one aspect of the present invention, there is provided a roll-shaped mold for forming an information recording medium which is characterized by having a pattern forming layer formed into a film on a roll-shaped mold substrate and having a pattern for formation of a groove for a track on a resin substrate for information recording medium by heat molding on the circumferential wall of said pattern forming layer.

According to another aspect of the present invention, there is provided a method for forming a roll-shaped mold for information recording medium which comprises film forming a pattern forming layer on a roll-shaped mold substrate and thereafter forming a pattern for a forming a groove for track by heat molding on a resin substrate for information recording medium on the circumferential wall thereof.

According to a further aspect of the present invention, there is provided a method for producing an information recording medium substrate which comprises effecting heat molding onto a resin substrate with a roll-shaped mold for information recording medium having a pattern forming layer formed into a film on a roll-shaped mold substrate and having a pattern for forming a groove for a track by heat molding on a resin substrate for information recording medium on the circumferential wall of said pattern forming layer.

According to the roll-shaped mold for information recording medium, its production method and the method for producing an information recording medium substrate by use of the mold of the present invention, the roll-shaped mold is separated into a roll-shaped mold substrate for which plane precision and mechanical strength are required and a pattern forming layer for which transferability onto the resin substrate for information recording medium, durability and easiness in patterning are demanded rather than mechanical strength, whereby broadness in choice of the materials to be used for the respective members has been widened. Accordingly, a highly precise pattern can be formed, and also a roll-shaped mold having a pattern forming layer most suitable for the resin plate for information recording medium to be molded can be obtained. Therefore, a pattern of the groove for a track can be transferred with good precision, whereby an information recording medium capable of giving good tracking signals can be produced.

DETAILED DESCRIPTION OF THE PREFERRED EMBODIMENTS

Figure 1:
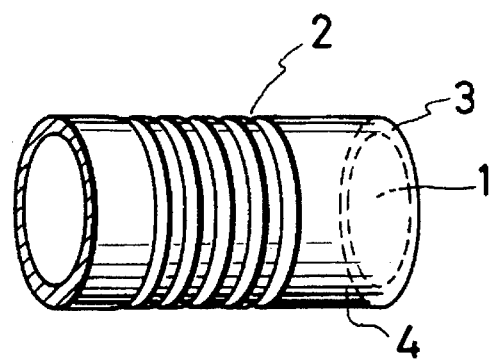
FIG. 1 is a perspective view of one embodiment of the roll-shaped mold for information recording medium according to the present invention.
Figure 2:
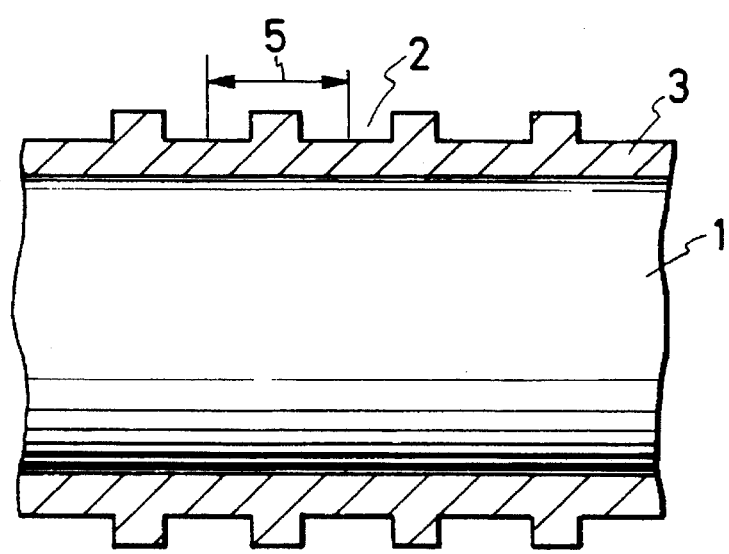
FIG. 2 is a sectional view of one embodiment of the present invention shown in FIG. 1.

FIG. 1 is a perspective view showing one embodiment of the roll-shaped mold for information recording medium of the present invention, and FIG. 2 is a sectional view thereof. In FIG. 1, the roll-shaped mold of the present invention comprises a plurality of grooves 2 for a forming grooves for track by heat molding on a resin substrate of an information recording medium in parallel to the circumferential direction of the circumferential wall 4 of the pattern forming layer 3 formed on a roll-shaped mold substrate 1 subjected to surface polishing.

In the present invention, for the roll-shaped mold substrate 1, metals, semiconductors, dielectric materials, or alloys may be employed. For example, materials capable of being mirror worked such as Al, glass, ultra-hard alloy, steel for mold (e.g. maraging steel), etc. may be used. Particularly, the material which can be easily mirror worked (Cr steel) is preferred.

As the pattern forming layer, when a pattern is to be formed by use of photolithographic technique, it is preferable to use a material on which etching of a pattern can be easily effected, and also of which a pattern can be well transferred onto a resin substrate of an information recording medium, particularly an optical card, optical disc or optical tape, etc., and also having durability, such as a metal or a metal compound. Specifically, there may be included TiN, $Si_3N_4$, CrN, TiC, SiC, WC, $Al_2O_3$, $ZrO_2$, $TiO_2$, $SiO_2$, $HfB_2$, $TiB_2$, Si, Ge, B, Al, Cr, Mo, Ni, Ta, V, W, Zr, etc.

Among them, Ni is a preferable material with respect to easiness of etching and transferability of a pattern onto a resin substrate.

The pattern forming layer 3 may be formed on the roll-shaped mold substrate 1 either by plating, vapor deposition or sputtering. The pattern forming layer 3 should preferably have a thickness of 1 μm to 120 μm, and particularly 80 μm to 100 μm.

Figure 3:
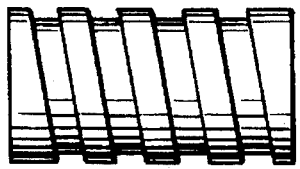
FIG. 3 is a sectional view of another embodiment of the roll-shaped mold for information recording medium according to the present invention.
Figure 4:
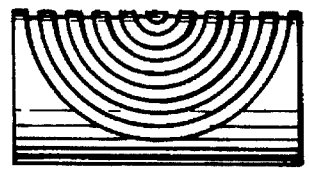
FIG. 4 is a sectional view of still another embodiment of the roll-shaped mold for information recording medium according to the present invention.
Figure 5A:
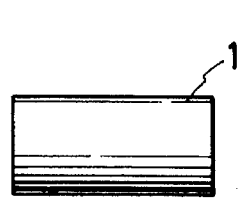
FIGS. 5A–5E are one embodiment of the method for producing the roll-shaped mold for information recording medium according to the present invention.
Figure 5B:
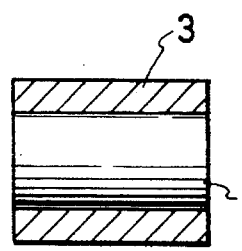
Figure 5C:
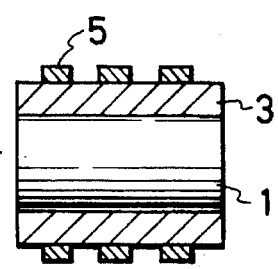
Figure 5D:
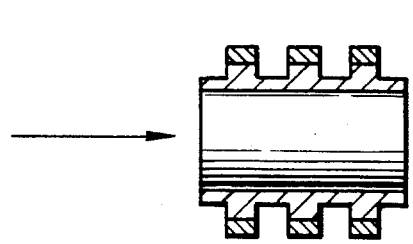
Figure 5E:
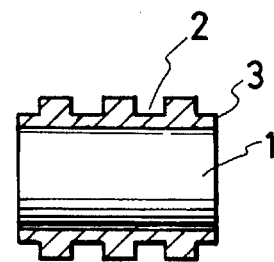

The shape and size of the grooves 2 formed on the pattern forming layer are not particularly limited, and any desired shape and size can be employed. However, the shape particularly preferred for formation of grooves for track of the information recording medium which performs recording and reproduction by light is one having a depth of groove ranging from 0.01 μm to 0.4 μm, a groove width ranging from 0.1 to 5.0 μm and a groove interval 5 ranging from 1.0 μm to 30 μm. By the grooves for a track obtained by transfer of a pattern with such a shape, good tracking signals can be obtained. The grooves 2 may be also formed parallel or perpendicular to the circumferential direction of the surface of the roll-shaped mold for formation of grooves for a track on the substrate for an optical card an optical tape, and may be also formed in a spiral shape as shown in FIG. 3. Further, as shown in FIG. 4, they may be formed also in a concentric shape for formation of grooves for a track on a substrate for an optical disc. As the resin substrate for the information recording medium to be used in the present invention, any material with good transparency can be used, but particularly polycarbonate and polymethyl methacrylate are preferred because they are good in moldability and inexpensive.

Referring now to FIGS. 5A–5E, one embodiment of the method for producing the roll-shaped mold for information recording medium of the present invention will be described.

First, after a roll-shaped substrate 1 is mirror polished, a pattern forming layer is formed into a film [Step 1, A→B].

The film forming method of the pattern forming layer may include plating, vapor deposition and sputtering as mentioned above.

Next, patterning is effected by forming a photoresist layer on the upper surface of a rigid thin film Z [Step 2, B→C].

For patterning, a conventional photolithographic technique can be utilized, or otherwise a photoresist layer can be formed by patterning according to picture drawing with electron beam followed by developing.

Next, the pattern forming layer not covered with the resist layer is etched by etching to a desired depth [Step 3, C→D]. For etching at this time, either dry etching or wet etching may be employed.

Subsequently, the remaining resist is removed to complete the roll-shaped mold for forming the information recording medium [Step 4, D→E].

In this embodiment, for reducing the surface roughness of the pattern forming layer 3, its surface may be mirror polished after film formation. Also, in the step of etching, it is preferable to effect etching while rotating the roll-shaped mold substrate, because a pattern with uniform depth can be formed. The rotational speed in this case may be 10 rpm or more, generally 30 to 120 rpm, and preferably 50 to 60 rpm.

AS other pattern formation methods, there may be, for example, the method in which the pattern forming layer is directly cut with ultra-precise lathe or the method in which a pattern is formed by scanning a high output laser such as a carbon dioxide laser on the pattern forming layer.

By use of the roll-shaped mold for forming an information recording medium of the present invention as described, the pattern of the grooves for a track of the roll-shaped mold can be transferred while delivering continuously the resin substrate as described above in the shape of a sheet according to the roll-to-roll system, or alternatively the pattern transfer of the grooves for track of the roll-shaped mold effected after extrusion of the melt extruded resin substrate, whereby an information recording substrate is obtained by forming grooves for a track which serve to guide the optical beam for recording and reproduction on a resin substrate for an information recording medium.

As described above, the following effects were obtained by the roll-shaped mold for forming an information recording medium and its production method of the present invention.

(1) Since fine working technique such as a photolithographic technique or an electron beam picture drawing, etc. is used, a high precision pattern can be formed on the roll-shaped mold for information recording medium, whereby grooves for a track of high precision can be transferred in the continuous molding in the roll-to-roll system.

(2) Since no direct pattern is formed on the substrate, it is not necessary to take readiness in etching of the substrate into consideration, and also the pattern forming layer can be also selected depending on readiness in etching, mold durability and transferability onto the resin, whereby broadness of the scope in choice of the materials can be widened.

(3) The film forming time of the pattern forming layer is short, with no step taking a long time as in the plating step of an electroformed mold, whereby the production time of the mold can be remarkably short to enable reduction in cost.

(4) The time required for formation of grooves for a track can be shortened to form an information recording medium at low cost.

The present invention is described in more detail by referring to the following Examples.

EXAMPLE 1

By use of a cylindrical SKD 61 tool steel of 150 mm in diameter as the roll-shaped mold substrate, its surface was polished to a surface roughness of 100 λ or less and then coated with electroless nickel plating to a thickness of 100 μm as the pattern forming layer. After surface polishing of the pattern forming layer to a surface roughness of 100 λ or less, a photoresist (trade name: AZ-1370, produced by Hoechst Japan) was applied by dipping to a thickness of about 1.5 μm. After exposure to a stripe shape with a groove width of 9 μm and an interval of 12 μm as the pattern of the groove for a track by means of a laser cutting device, developing was carried out with a developer (trade name: AZ-312, produced by Hoechst Japan) and post-baking was effected at 120° C. for 30 minutes, followed by etching in 10 wt. % aqueous phosphoric acid at a current density of 1A/dm$^2$ while rotating the roll-shaped mold at 60 rpm.

After etching, by removing the remaining photoresist by a photoresist remover (trade name AZ-100, produced by Hoechst Japan), a roll-shaped mold for an information recording medium having a groove with a groove width of 9 μm, a depth of 0.3 μm and an interval of 12 μm formed in parallel to the circumferential direction on the circumferential wall of the pattern forming layer was obtained.

By use of the roll-shaped mold for information recording medium, a groove for a track of an optical card was transferred according to the roll-to-roll system at a mold temperature of 180° C. onto a polycarbonate sheet (trade name: Panlite Sheet, produced by Teijin Kasei) with a thickness of 0.4 mm. As the result, an information recording medium substrate having the pattern of the roll-shaped mold for information recording medium transferred at a precision within the range of ±10% was obtained.

EXAMPLE 2

By use of a cylindrical SKD 61 tool steel of 150 mm in diameter as the roll-shaped mold substrate, its surface was polished to a surface roughness of 100 λ or less and then a TiN film was formed by vapor deposition to a film thickness of 2 μm as the pattern forming layer. After surface polishing of the pattern forming layer to a surface roughness of 100 λ or less, a photoresist (trade name: AZ-1370, produced by Hoechst Japan) was applied by dipping to a thickness of about 1.0 μm. After exposure to a stripe shape with a groove width of 9 μm and an interval of 12 μm as the pattern of the groove for a track of an optical card by means of a laser cutting device, developing was carried out with a developer (trade name: AZ-312, produced by Hoechst Japan) and post-baking was effected at 120° C. for 30 minutes, followed by etching of CF$_4$ reactive gas under a vacuum degree of 7 Pa, R.F. discharging power of 150 W for 30 minutes by means of a dry etching device equipped with an ion gun while rotating the roll-shaped mold at 60 rpm.

Subsequently, by removing the remaining photoresist by a photoresist remover (trade name AZ-100, produced by Hoechst Japan), a roll-shaped mold for forming an information recording medium having a groove with a groove width of 9 μm, a depth of 0.3 μm and an interval of 12 μm formed in parallel to the circumferential direction on the circumferential wall of the pattern forming layer was obtained.

By use of the roll-shaped mold for forming an information recording medium, a groove for a track was transferred onto a polymethyl methacrylate plate with a thickness of 0.4 mm formed by the extrusion method simultaneously with extrusion at a roll-shaped mold temperature of 140° C. As the result, an information recording medium substrate having the pattern of the roll-shaped mold for information recording medium transferred at a precision within the range of ±10% was obtained.

EXAMPLE 3

By use of a cylindrical SKD 61 tool steel of 150 mm in diameter as the roll-shaped mold substrate, its surface was polished to a surface roughness of 100 λ or less and then coated with an electroless nickel plating to a thickness of 100 μm as the pattern forming layer. After surface polishing of the pattern forming layer to a surface roughness of 100 λ or less, a photoresist (trade name: AZ-1370, produced by Hoechst Japan) was applied by dipping to a thickness of about 0.5 μm. After exposure to a concentric shape with a groove width of 0.6 μm and an interval of 1.6 μm as the pattern of the groove for a track of an optical disc by means of a laser cutting device, developing was carried out with a developer (trade name: AZ-312, produced by Hoechst Japan) and post-baking was effected at 120° C. for 30 minutes, followed by etching of CF$_4$ reactive gas under a vacuum degree of 7 Pa, R.F. discharging power of 150 W for 10 minutes by means of a dry etching device while rotating the roll-shaped mold at 60 rpm.

After etching, by removing the remaining photoresist by a photoresist remover (trade name AZ-100, produced by Hoechst Japan), a roll-shaped mold for information recording medium having a groove with a groove width of 0.6 μm, an interval of 1.6 μm and a depth of 0.14 μm formed concentrically to the circumferential wall of the pattern forming layer was obtained.

By use of the roll-shaped mold for a information recording medium, a groove for a track of an optical disc was transferred onto a polycarbonate sheet (Panlite Sheet, produced by Teijin Kasei) with a thickness of 1.2 mm according to the roll-to-roll system at a roll-shaped mold temperature of 150° C. As the result, an information recording medium substrate having the pattern of the roll-shaped mold for information recording medium transferred at a precision within the range of ±14% was obtained.

We claim:

1. A roll-shaped mold for forming an information recording medium, comprising:

a roll-shaped mold substrate having a mirror polished surface; and a pattern forming layer formed around said mirror polished surface and having a preformat pattern on its surface, said pattern forming layer being made of a material selected from the group consisting of TiN, Si$_3$N$_4$, CrN, TiC, SiC, WC, Al$_2$O$_3$, ZrO$_2$, TiO$_2$, SiO$_2$, HfB$_2$, TiB$_2$, Si, Ge, B, Al, Cr, Mo, Ni, Ta, V, W and Zr, and said roll-shaped mold substrate being made of a different material from that of said pattern forming layer, and said pattern forming layer being formed around said mirror polished surface by one of plating, vapor deposition and sputtering, wherein said preformat pattern is formed by one of a photolithographic technique and electron beam picture drawing and comprises a pattern of striped grooves parallel with each other and said preformat pattern being formed in parallel to a circumferential direction of said roll-shaped mold substrate.

2. A roll-shaped mold for forming an information recording medium according to claim 1, wherein said pattern forming layer comprises Ni.

3. A roll-shaped mold for forming an information recording medium according to claim 1, wherein said pattern forming layer has a thickness of 1 μm to 120 μm.

4. A roll-shaped mold for forming an information recording medium according to claim 3, wherein said pattern forming layer has a thickness of 80 μm to 100 μm.

5. A roll-shaped mold for forming an information recording medium according to claim 1, wherein said preformat pattern has a pattern corresponding to a track groove having a depth of 0.01 μm to 0.4 μm.

6. A roll-shaped mold for forming an information recording medium according to claim 1, wherein said preformat pattern has a pattern corresponding to a track groove having a width of 0.1 μm to 5.0 μm.

7. A roll-shaped mold for forming an information recording medium according to claim 1, wherein said preformat pattern has a pattern corresponding to track grooves for an optical disc which are formed concentrically with respect to each other.

8. A roll-shaped mold for forming an information recording medium according to claim 1, wherein said pattern forming layer is made of TiN.

9. A roll-shaped mold for forming an information recording medium according to claim 1, wherein said preformat pattern has a pattern corresponding to track grooves having an interval between grooves of 1 μm to 30 μm.

10. A roll-shaped mold for forming an optical card substrate having striped tracking grooves, comprising a preformat pattern formed on a peripheral surface of the roll-shaped mold, said preformat pattern corresponding to the tracking grooves, and said preformat pattern being formed in parallel to a circumferential direction of the peripheral surface of the roll-shaped mold.

11. A process for preparing a substrate for an optical card having striped tracking grooves, comprising the steps of:

melt-extruding a thermoplastic resin sheet; and molding tracking grooves on the melted extruded resin sheet by using a roll-shaped mold having a preformat pattern corresponding to the tracking-grooves on its peripheral surface, wherein the preformat pattern is formed in parallel to a circumferential direction of the peripheral surface of the roll-shaped mold.

12. An apparatus for producing a substrate for an optical card having striped tracking grooves, said apparatus comprising:

means for melt-extruding a thermoplastic resin sheet; and a roll-shaped mold having a preformat pattern corresponding to tracking-grooves on its peripheral surface to form the tracking grooves on the melt-extruded resin sheet, wherein said preformat pattern is formed in parallel to a circumferential direction of the peripheral surface of said roll-shaped mold.

13. A method for producing a substrate for an information recording medium, comprising the steps of:

providing a roll-shaped mold substrate having a mirror polished surface and a pattern forming layer formed around the mirror polished surface, with the pattern forming layer having a preformat pattern on its surface comprised of a pattern of striped grooves parallel with each other and parallel to a circumferential direction of the roll-shaped mold substrate; and heat molding a resin substrate with the roll-shaped mold to form an information recording medium.

14. A method for producing a substrate for information recording medium according to claim 13, wherein the resin substrate for information recording medium is formed by melt extrusion.

15. A method for producing a substrate for information recording medium according to claim 13, wherein the information recording medium is an optical card.

* * * * *

UNITED STATES PATENT AND TRADEMARK OFFICE
CERTIFICATE OF CORRECTION

PATENT NO. : 5,575,961
DATED : November 19, 1996
INVENTOR(S) : Kuwabara et al.

Page 1 of 2

It is certified that error appears in the above-indentified patent and that said Letters Patent is hereby corrected as shown below:

COLUMN 1:

Line 57, "for" should read --for a--.

COLUMN 2:

Line 14, "for" should read --for a--.

COLUMN 3:

Line 47, "an" (second occurrence) should read --or an--.

COLUMN 4:

Line 19, "AS" should read --As--.

COLUMN 5:

Line 1, "100 λ" should read --100 Å--.
  Line 4, "100 λ" should read --100 Å--.
  Line 26, "Kaset)" should read --Kasei)--.
  Line 36, "100 λ" should read --100 Å--.
  Line 39, "100 λ" should read --100 Å--.

COLUMN 6:

Line 8, "100 λ" should read --100 Å--.

UNITED STATES PATENT AND TRADEMARK OFFICE
CERTIFICATE OF CORRECTION

PATENT NO. : 5,575,961  Page 2 of 2
DATED : November 19, 1996
INVENTOR(S) : Kuwabara et al.

It is certified that error appears in the above-indentified patent and that said Letters Patent is hereby corrected as shown below:

Line 11, "100 $\lambda$" should read --100 Å--.

COLUMN 8:

Line 1, "tracking-grooves" should read --tracking grooves--.
Line 12, "tracking-grooves" should read --tracking grooves--.
Line 30, "for" should read --for an--.
Line 32, "for" should read --for the--.
Line 34, "for" should read --for an--.

Signed and Sealed this

Twenty-second Day of July, 1997

Attest:

BRUCE LEHMAN

Attesting Officer   Commissioner of Patents and Trademarks